United States Patent Office 3,313,821
Patented Apr. 11, 1967

3,313,821
PROCESS FOR PREPARING PYRIDINE CARBOXYLIC ACIDS FROM COMPOUNDS HAVING A PYRIDINE NUCLEUS
Robert D. Lekberg, Worth, Raymond A. Jensen, Alsip, and William Buiter, Oak Lawn, Ill., assignors to Chemlek Laboratories, Inc., Alsip, Ill., a corporation of Illinois
No Drawing. Filed Aug. 3, 1964, Ser. No. 387,175
6 Claims. (Cl. 260—295.5)

This invention relates to an improved process for oxidizing organic compounds of the class having a pyridine nucleus with oxidizable substituents wherein at least one of the substituents is oxidized to a carboxylic group. More in particular this invention relates to the production of nicotinic acid from beta-substituted pyridine compounds.

Nicotinic acid, sometimes referred to as Niacin, is believed to be an important constituent of the vitamin B complex and hence is a therapeutically valuable compound having a large volume demand. Being of a therapeutic type compound the production thereof must be highly purified and essentially free from toxic impurities.

When substituted pyridine compounds such as, for example, beta-picoline (i.e. 3-methyl pyridine) are oxidized under strong acid conditions, particularly when the pH value is 4.2 or below, the nicotinic acid formed precipitates with other ingredients and the separation process is complicated and costly as the product must be pharmaceutically pure. Furthermore such processes require expensive acid resistant equipment. These difficulties were overcome in part by oxidizing substituted pyridine compounds essentially in a neutral to alkaline condition (although the pH value may be of very weak acidity) by reaction with an aqueous solution of a soluble hexavalent chromium compound wherein the amount of hexavalent chromium is 50% in excess of theoretical requirement as described in U.S. Patent No. 2,415,147 to James Ogilvie and Alvin J. Sweet. The excess hexavalent chromium being soluble and toxic contaminates the product and presents considerable difficulty in its subsequent separation therefrom. Although the referred to patent does not state the percentage conversion of the substituted pyridine compound to its corresponding pyridine carboxylic acid (i.e. percent yield), we found that upon carefully following the procedure outlined in the example therein only about 65 percent conversion was obtained as a maximum. Furthermore additional reaction time did not improve the yield and the reaction mass precipitated chromic oxide, unreacted beta-picoline and sodium dichromate, water, sodium hydroxide, and the sodium salt of nicotinic acid. The subsequent steps of the process to obtain free nicotinic acid in a pharmaceutically pure state were numerous and obviously expensive.

It is a primary object of the present invention to improve the process disclosed in the above mentioned patent wherein the yield is at least 85 percent of theoretical maximum.

A further object of this invention is to improve the process disclosed in the above mentioned patent wherein the procedural steps required to obtain a pharmaceutically pure product are greatly simplified.

Another important object of the invention is to perform the reactions according to the preceding objects wherein stoichiometrical proportions of reactants are used thereby avoiding costly steps in removal of excess reactants.

A still further important object of this invention is to improve the process disclosed in the above mentioned patent wherein the tri-valent nitrogen atom of the pyridine ring of a compound of the class having a pyridine nucleus with an oxidizable substituent is converted to the penta-valent state as a preliminary step in the improved process.

Another important object of the invention is to improve the process disclosed in the above mentioned patent wherein a salt of a compound having a pyridine nucleus with an oxidizable substituent is employed as a starting ingredient.

A still further object of the invention is to improve the process disclosed in the above mentioned patent wherein the production cost of the desired product is greatly reduced.

These and other desirable objects inherent in and encompassed by the invention will be more readily understood from the ensuing description and the appended claims.

Referring again to U.S. Patent No. 2,415,147 when a substituted pyridine compound (e.g. beta-picoline) is oxidized with an aqueous solution of a hexavalent chromium compound (e.g. sodium dichromate) the mechanism involves the freeing of two sodium ions for every one oxidized carbon atom in the oxidizable substitution group attached to the pyridine ring. Thus in the case of beta-picoline for each molecule reacted to form nicotinic acid, two sodium ions are freed. One of these sodium ions reacts to form the sodium salt of nicotinic acid and the other reacts to form sodium hydroxide. As the reaction progresses the amount of sodium hydroxide formed correspondingly increases and thus the pH value progressively rises until the value reaches the 11 to 12 range where further reaction terminates irrespective of time. This explains why the maximum yield of nicotinic acid from beta-picoline reached only about 65 percent of maximum theoretical yield obtained under the process disclosed in the aforementioned patent. Where other substituted pyridine compounds were oxidized by the same method, such as quinoline, yields as low as 49 percent theoretical maximum were obtained and in no case exceeded 65 percent.

Our improvement in the process disclosed in the above mentioned patent consists of altering or modifying a principal starting ingredient, namely, the compound having a pyridine nucleus with an oxidizable substituent.

It will be first observed that the nitrogen atom in the pyridine ring of a compound having a pyridine nucleus is in the trivalent state. Thus in the case of beta-picoline the structural formula is:

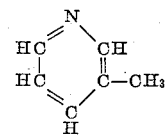

wherein the nitrogen atom is in its trivalent state. It is well known that the trivalent nitrogen atom in a pyridine ring behaves as a tertiary amine and reacts with monobasic and polybasic acids to form a salt wherein the nitrogen atom is in the penta-valent state. Thus beta-picoline reacts with hydrochloric acid to form its corresponding hydrochloride in accordance with the following equation:

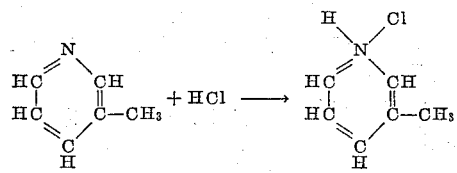

The acid employed in forming the amine salt with the nitrogen atom of the pyridine ring must be that of a non-oxidizable character under the conditions of the process. The term "non-oxidizable acid" as used herein means an acid capable of forming an amine salt with the nitrogen atom of a pyridine ring and yet under the conditions of the process is incapable of oxidizing or being oxidized. Thus acids such as boric acid, sulfuric acid and phosphoric acid may be used instead of the hydrochloric acid in the above equation for under the conditions of the process herein none exhibits an oxidation reaction.

Now, according to our invention, when a compound having a pyridine nucleus with an oxidizable substituent converted to its amine salt by a non-oxidizable acid is employed in a reaction to oxidize the oxidizable substituent thereof, in the manner disclosed in the aforesaid patent the excess sodium hydroxide formed promptly reacts with the acid constituents of the amine salt thereby neutralizing the sodium hydroxide. Thus, for example, in the case of beta-picoline hydrochloride the excess sodium hydroxide is neutralized by the formation of sodium chloride in accordance with the following equation:

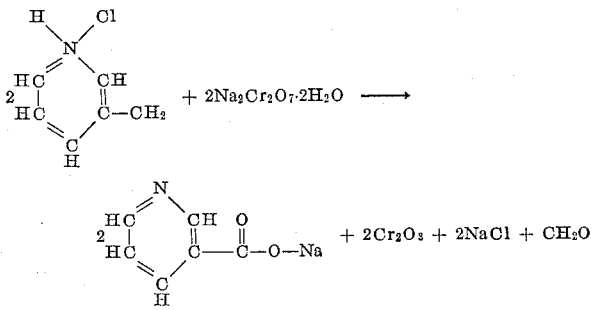

wherein the nitrogen portion of the pyridine ring is reverted from its salt behavior to its amine like property within the pyridine ring. From this it is abundantly apparent that during the course of the reaction of oxidizing the oxidizable substituent of the compound having a pyridine nucleus with sodium dichromate the excess sodium hydroxide is immediately neutralized and thus the pH value remains substantially the same as that of the mixture prior to the start of the oxidation reaction. It is therefore apparent that our improvement requires as an essential element the presence of a pyridine ring in the compound to be oxidized.

At this point it should be stated that the conversion of a compound having a pyridine nucleus or ring to its corresponding amine salt has little if any effect on the pH value in aqueous solution. For example, the reaction product between beta-picoline and sulfuric acid (or hydrochloric acid) possesses, in aqueous solution, a pH value close to seven and thus nearly neutral. From this it is seen that the oxidation reaction may be performed using inexpensive steel equipment. The fact that the pH value can be maintained close to seven during the entire oxidation reaction with sodium dichromate permits the reaction to proceed essentially to completion. Furthermore, the amount of hexavalent chromium compound employed herein is theoretical as compared with 50 percent excess amount required pursuant to the aforementioned patent and thus no chromium appears in the final reacted mass in a soluble form. All of the chromium precipitates as insoluble chromic oxide and the carboxylated pyridine is in the form of its soluble metal salt, e.g. sodium salt of nicotinic acid. The temperature in which the oxidation reaction is carried out varies depending upon the organic compound being oxidized in the autoclave but the temperature range should be between 300° F. and 550° F. However, the more preferable temperature range is 400° F. to 550° F.

By way of illustration of the invention the following specific examples are shown.

EXAMPLE 1

An autoclave capable of sustaining 600 pounds per square inch internal pressure was charged with 186 grams (2 mol. wts.) of beta-picoline, 596 grams (2 mol. wts.) of hydrated sodium dichromate, and 596 grams of water and sealed in closed position. The autoclave was then heated by application of external heat to a temperature of 450° F. for a period of 30 hours, no additional pressure of an external source being applied. The autoclave was then cooled and the reaction mass treated in accordance with the procedure outlined in the example shown in the aforementioned patent. The yield of nicotinic acid was 65 percent theoretical maximum.

EXAMPLE 2

The autoclave of Example 1 was charged with the amine salt formed by reacting 186 grams (2 mol. wts.) of beta-picoline and 102 grams of 66° Baumé sulfuric acid (1 mol. wt.), 596 grams of water, and 596 grams (2 mol. wts.) of hydrated sodium dichromate, and heated to 440° F. for a period of 10 hours. After cooling the autoclave was opened and the final reaction mass removed therefrom.

Upon addition of water the theoretical amount of chromium in the form of insoluble chromic oxide was removed by simple filtration. No chromium was found in the filtrate. The filtrate consisted of the sodium salt of nicotinic acid, sodium sulfate, and water.

To the resulting filtrate was added hydrochloric acid until the pH value was lowered to about 4.3. This hydrolyzed the sodium salt of nicotinic acid and the free nicotinic acid precipitated and was removed by simple filtration with aqueous wash and dried. The yield of nicotinic acid thus obtained was 87 percent of theoretical maximum and was pure.

EXAMPLE 3

The autoclave of Example 1 was charged with the amine salt formed by reacting 186 grams (2 mol. wts.) of beta-picoline and 232 grams of 31.45% HCl aqueous solution of hydrochloric acid (2 mol. wts.), 596 grams of water, and 596 grams (2 mol. wts.) of hydrate sodium dichromate, and heated to 440° F. for a period of 9 hours. After cooling the autoclave was opened and the reaction mass removed therefrom and treated in the same manner as that described in Example 2. The yield of nicotinic acid thus obtained was 87.5 percent of theoretical maximum and was pure.

Although in both Examples 2 and 3 the reaction was complete as evidenced by the fact that all of the chromium in the reaction mass was in the form of insoluble chromic oxide, losses occur in the separating steps. Probably the greatest single loss is due to the fact that nicotinic acid is slightly soluble in water and thus a portion does not precipitate in the hydrolyzing step.

EXAMPLE 4

The autoclave of Example 1 was charged with the amine salt formed by reacting 186 grams (2 mol. wts.) of beta-picoline with 124 grams (2 mol. wts.) of boric acid in 768 grams of water. To this was added 596 grams (2 mol. wts.) of hydrated sodium dichromate and the mixture heated to 450° F. for a period of 42 hours. The resulting reaction forming nicotinic acid was found to be 92 percent complete.

Example 4 illustrates employment of a tribasic acid wherein but one of the three acid groups of the boric acid is used to form the amine salt with the amino nitrogen atom of the pyridine ring.

Other compounds having a pyridine nucleus with oxidizable substituents may advantageously employ the amine salt form of the nitrogen atom in the pyridine ring according to the present invention as illustrated in the following two examples.

EXAMPLE 5

The autoclave of Example 1 was charged with the reaction product of 121 grams of 2,5-methyl ethyl pyridine (one mol. wt.) and 102 grams of 66° Baumé sulfuric acid (two equivalents). The resulting salt is very soluble in water whereas the pure unreacted 2,5-methyl ethyl pyridine is insoluble in water. To the above salt was added 894 grams of water and 894 grams (3 mol. wts.) of hydrated sodium dichromate. The mass was heated to 440° for 8.5 hours. The resulting reaction forming nicotinic acid was found to be greater than 80 percent complete. At lower temperatures this reaction proceeds to form 2,5-pyridine carboxylic acid (isocinchomeronic acid) which is useful as an intermediate in the production of nicotinic acid.

EXAMPLE 6

The autoclave of Example 1 was charged with the reaction product of 129 grams (one mol. wt.) of quinoline and 102 grams of 66° Baumé sulfuric acid (2 equivalents). The salt formed is very soluble in water in contrast to the low solubility of quinoline in water. To this was added 894 grams of water and 894 grams (3 mol. wts.) of hydrated sodium dichromate and the resulting mass heated to 440° F. for 8.25 hours. The reaction proceeded to form nicotinic acid to greater than 80 percent completion.

It was stated previously that two sodium ions are freed during the reaction for every oxidized carbon atom in a substitution group attached to the pyridine ring. It will thus become apparent to those skilled in the art that in the cases of Examples 5 and 6 above there was an insufficiency in sulfate ions to neutralize all of the sodium hydroxide formed in the reactions. Although the pH value at the start of the reactions was not below 5.5 the excess sodium hydroxide formed during the reactions elevated the pH value enough to terminate the reaction before 90% completion. Therefore it immediately becomes apparent that in the preparation of nicotinic acid the amine salt should be formed stoichiometrically, utilizing but one of the two acid groups of the sulfuric acid. In other words, one mol. wt. of the pyridine compound (e.g. beta-picoline) is reacted with one mol. wt. of sulfuric acid to form the amine salt. Thus an aqueous mixture of three mol. weights of beta picoline hydrosulfate plus one mol. weight of quinoline hydrosulfate (or 2,5 methyl ethyl pyridine hydrosulfate) plus six mol. weights of hydrated sodium dichromate will react under conditions specified in the above examples to form nicotinic acid in yields exceeding 90 percent theoretical because there are sufficient sulfate ions to react with all of the sodium hydroxide formed.

From the foregoing it can readily be appreciated that the improvement comprising the present invention upon the method disclosed in U.S. Patent No. 2,415,147 not only greatly increases the yield of the desired product resulting from the oxidation of pyridine compounds having at least one oxidizable substituent but also greatly simplifies the removal of the final product from the reaction mass, principally its complete separation from the toxic compounds of chromium. Furthermore, since the oxidation reaction can be carried out substantially to completion at a pH value close to 7 the equipment and apparatus does not have to be constructed of special high cost acid-resistant components. Thus the autoclave, for example, may be constructed of low priced steel.

Having thus described various embodiments of the invention it can now be seen that the objects of the invention have been fully achieved and it must be understood that changes and modifications may be made which do not depart from the spirit of the invention nor from the scope thereof as defined in the appended claims.

What is claimed is:

1. A process for oxidizing a heterocyclic nitrogen compound containing in its structure a pyridine nucleus having at least one oxidizable organic group attached to said nucleus by at least one carbon-to-carbon linkage selected from the group comprising beta-picoline, methyl ethyl pyridine, and quinoline to a pyridine carboxylic acid product consisting of the steps of reacting said compound with at least one stoichiometric equivalent of a non-oxidizable acid to form a quaternary amine salt with the nitrogen atom of said pyridine nucleus, reacting said formed salt with an aqueous solution of a stoichiometric equivalent of a hexavalent chromium oxidizing compound selected from the group comprising sodium dichromate and sodium chromate at a pH value of not less than 5.5 and at a temperature of at least about 300° F. and under super-atmospheric pressure equivalent to at least the generated pressure of the reacting mixture at the temperature employed until the reaction is substantially complete, filtering the reaction mass thus obtained, acidifying the resulting filtrate and removing the said pyridine carboxylic acid product from said acidified filtrate.

2. A process for oxidizing a heterocyclic nitrogen compound containing in its structure a pyridine nucleus having at least one oxidizable organic group attached to said nucleus by at least one carbon-to-carbon linkage selected from the group comprising beta-picoline, methyl ethyl pyridine, and quinoline to a pyridine carboxylic acid product consisting of the steps of reacting said compound with a stoichiometric equivalent of a non-oxidizable acid to form a quaternary amine salt with the nitrogen atom of said pyridine nucleous, reacting said formed salt with an aqueous solution of a stoichiometric equivalent of a hexavalent chromium oxidizing compound selected from the group comprising sodium dichromate and sodium chromate at a pH value of not less than 5.5 and at a temperature between about 400° F. and about 550° F. and under super-atmospheric pressure equivalent to at least the generated pressure of the reaction mixture at the temperature employed until the reaction is substantially complete, filtering the reaction mass thus obtained, acidifying the resulting filtrate and removing the said pyridine carboxylic acid product from said acidified filtrate.

3. A process for preparing nicotinic acid product from the oxidation of beta-picoline consisting of the steps of reacting said beta-picoline with a stoichiometric equivalent of a non-oxidizable acid to form a quaternary amine salt with the nitrogen atom of said beta-picoline, reacting said formed salt with a substantially neutral to alkaline aqueous solution of a stoichiometric equivalent of sodium dichromate at a temperature of between about 400° F. and 550° F. and under super-atmospheric pressure at least equivalent to the generated pressure of the reacting mixture at the temperature employed until the reaction is substantially complete, filtering the reaction mass thus obtained, acidifying the resulting filtrate sufficiently to precipitate the nicotinic acid product, and removing said product therefrom.

4. A process for preparing nicotinic acid product according to claim 3 wherein the non-oxidizable acid is an acid selected from the group consisting of sulfuric acid, hydrochloric acid, boric acid, and phosphoric acid.

5. A process for preparing nicotinic acid product from the oxidation of quinoline consisting of the steps of reacting said quinoline with a stoichiometric equivalent of a non-oxidizable polybasic acid to form a quaternary amine salt with the nitrogen atom of said quinoline, reacting said formed salt with an aqueous solution of sodium dichromate at a pH value of not less than 5.5 and at a temperature of between about 400° F. and 550° F. and under superatmospheric pressure at least equivalent to the generated pressure of the reacting mixture at the temperature employed until the reaction terminates, filtering the reaction mass thus obtained, acidifying the resulting filtrate sufficiently to precipitate the nicotinic acid product, and removing said product therefrom.

6. A process for preparing nicotinic acid product from the oxidation of 2,5-methyl ethyl pyridine consisting of the steps of reacting said 2,5-methyl ethyl pyridine with a stoichiometric equivalent of a non-oxidizable polybasic acid to form a quaternary amine salt with the nitrogen atom of said 2,5-methyl ethyl pyridine with a stoichiometric equivalent of a non-oxidizable polybasic acid to form a quaternary amine salt with the nitrogen atom of said 2,5-methyl ethyl pyridine, reacting said formed salt with an aqueous solution of sodium dichromate at a pH value of not less than 5.5 and at a temperature of between 400° F. and 550° F. and under superatmospheric pressure at least equivalent to the generated pressure of the reacting mixture at the temperature employed until the reaction terminates, filtering the reaction mass thus obtained, acidifying the resulting filtrate sufficiently to precipitate the nicotinic acid product, and removing said product therefrom.

References Cited by the Examiner

UNITED STATES PATENTS

| | | | |
|---|---|---|---|
| 2,415,147 | 2/1947 | Ogilvie et al. | 260—295.5 |
| 2,586,555 | 5/1950 | Mueller | 260—295.5 |

WALTER A. MODANCE, *Primary Examiner.*
JOHN D. RANDOLPH, *Examiner.*
ALAN L. ROTMAN, *Assistant Examiner.*